United States Patent
Okajima et al.

(10) Patent No.: US 7,559,261 B2
(45) Date of Patent: Jul. 14, 2009

(54) DEVICE AND METHOD FOR MEASURING MOLECULE USING GEL SUBSTRATE MATERIAL

(75) Inventors: Takaharu Okajima, Sapporo (JP); Hiroshi Tokumoto, Sapporo (JP)

(73) Assignee: National University Corporation Hakkaido University, Sapporo-shi (JP)

( * ) Notice: Subject to any disclaimer, the term of this patent is extended or adjusted under 35 U.S.C. 154(b) by 345 days.

(21) Appl. No.: 11/662,071

(22) PCT Filed: Sep. 7, 2005

(86) PCT No.: PCT/JP2005/016422

§ 371 (c)(1),
(2), (4) Date: Mar. 7, 2007

(87) PCT Pub. No.: WO2006/028135

PCT Pub. Date: Mar. 16, 2006

(65) Prior Publication Data

US 2007/0272040 A1    Nov. 29, 2007

(30) Foreign Application Priority Data

Sep. 9, 2004    (JP)    ............................ 2004-262227

(51) Int. Cl.
*G01L 5/00* (2006.01)
*G01N 13/10* (2006.01)
*G01N 3/08* (2006.01)

(52) U.S. Cl. ........................ 73/862.56; 73/827; 73/828; 73/866; 850/5; 850/62

(58) Field of Classification Search .................. 73/105, 73/862.56, 827–828, 866; 850/5, 35, 62
See application file for complete search history.

(56) References Cited

U.S. PATENT DOCUMENTS 6,677,697 B2 *    1/2004    Struckmeier et al. ...... 73/105 X
(Continued)

FOREIGN PATENT DOCUMENTS

JP    11044696 A *    2/1999
(Continued)

OTHER PUBLICATIONS

Frisbie, C.D., et al., "Functional Group Imaging by Chemical Force Microscopy", *Science*, vol. 265, pp. 2071-2074, (Sep. 30, 1994).
(Continued)

*Primary Examiner*—Thomas P Noland
(74) *Attorney, Agent, or Firm*—The Nath Law Group; Jerald L. Meyer; Derek Richmond

(57) ABSTRACT

A device for measuring a molecule, wherein a gel substrate material (200) comprises a gel (220) containing a solvent in the network structure thereof and a molecular chain (210), and a cantilever (100) is bound with the molecular chain (210) by a covalent bonding or a physical bonding and pulls up the molecular chain (210) through the above bonding, and wherein the force loaded when the cantilever (100) pull up the molecular chain (210) is measured and the interaction between polymer chains acting between the gel (200) and the molecular chain (210) is detected. The above device can be used for measuring the interaction between molecules, and in particular, can construct an experiment system for measuring the non-covalent bonding interaction between polymer chains at a molecular level.

3 Claims, 6 Drawing Sheets

U.S. PATENT DOCUMENTS

| | | | |
|---|---|---|---|
| 7,495,240 B2 * | 2/2009 | Hopkins et al. | 73/105 X |
| 2004/0116305 A1 * | 6/2004 | Osada et al. | 508/110 |
| 2008/0289404 A1 * | 11/2008 | Okajima et al. | 73/105 |

FOREIGN PATENT DOCUMENTS

JP     2001165840 A * 6/2001

OTHER PUBLICATIONS

Lee, G.U., et al., "Sensing Discrete Streptavidin-Biotin Interactions with Atomic Force Microscopy", *Langmuir*, vol. 10, pp. 354-357, (1994).

Mitsui, K., et al., "Mechanical unfolding of $\alpha_2$-macroglobulin molecules with atomic force microscope", *FEBS Letters*, vol. 385, pp. 29-33 (1996).

Rief, M., et al., "Reversible Unfolding of Individual Titin Immunoglobulin Domains by AFM", *Science*, vol. 276, pp. 1109-1112, (May 16, 1997).

Yamamoto, S., et al., "Atomic Force Microscopic Study of Stretching a Single Polymer Chain in a Polymer Brush", *Macromolecules*, vol. 33, No. 16, pp. 5995-5998, (2000).

Grandbois, M., et al, "How Strong Is a Covalent Bond?" Science, vol. 283, pp. 1727-1730, (Mar. 12, 1999).

Idiris, A., et al., "Spring mechanics of $\alpha$-helical polypeptide", *Protein Engineering*, vol. 13, No. 11, pp. 763-770, (2000).

Ortiz, C., et al., "Entropic Elasticity of Single Polymer Chains of Poly (methacrylic acid) Measured by Atomic Force Microscopy", *Macromolecules*, vol. 32, pp. 780-787, (1999).

Bemis, J.E., et al., "Single Polymer Chain Elongation by Atomic Force Microscopy", *Langmuir*, vol. 15, No. 8, pp. 2799-2805, (1999).

Binnig, G., et al., "Atomic Force Microscope", *Physical Review Letters*, vol. 56, No. 9, pp. 930-933, (Mar. 3, 1986).

* cited by examiner

DEVICE AND METHOD FOR MEASURING MOLECULE USING GEL SUBSTRATE MATERIAL

TECHNICAL FIELD

The present invention relates to a molecule measuring apparatus and molecule measuring method, and more particularly, to a molecule measuring apparatus and molecule measuring method for measuring a single molecule (or a plurality of molecules) using an atomic force microscope.

BACKGROUND ART

The atomic force microscope (hereinafter "AFM") developed in 1986 (see Non-patent Document 1), is the kind of microscope that enables high resolution observation of the surface structures of conductors, semiconductors and insulators (including polymers and biomaterials). By using the single-molecule measuring method (also called "force spectroscopy") of the AFM, the intermolecular interaction (intermolecular bonding strength) at single molecule levels (see Non-patent Documents 2 and 3) and the intra-molecular interaction (conformation change of a single molecule) (see Non-patent Documents 4 and 5) can be examined. The conventional single-molecule measuring method is the kind of technique of sandwiching a macromolecule between a probe and a solid substrate and extending the molecule in a single axis direction.

In the polymer industry, it is basically important to understand the viscosity (inter-polymer interaction, polymer/solvent interaction) and elastic property (intra-polymer and inter-polymer interaction) of bulk material. It may be expected that when the size of materials is close to nanoscale, the measurement of "inter-polymer" interaction of a plurality of molecules or a single molecule is increasingly required to elucidate the properties of the materials.

Non-patent Document 1: G. Binnig, C. F. Quate, and Ch. Gerber, "Atomic Force Microscope", Phys. Rev. Lett. Vol. 56, 1986, p. 930.

Non-patent Document 2: Frisbie, C. D., Rozsnyai, L. F., Noy, A., Wrighton, M. S. and Lieber, C. M. "Functional Group Imaging by Chemical Force Microscopy", Science Vol. 265, 1994, p. 2071.

Non-patent Document 3: Lee, G. U., Kidwell, D. A. and Colton, R. J. "Sensing Discrete Streptavidin-Biotin Interactions with Atomic Force Microscopy", Langmuir Vol. 10, 1994, p. 354-357.

Non-patent Document 4: K. Mitsui, M. Hara, A. Ikai, FEBS Lett. "Mechanical unfolding of alpha2-macroglobulin molecules with atomic force microscope", Vol. 385, 1996, p. 29.

Non-patent Document 5: M. Rief, M. Gautel, F. Oesterhelt, J. M. Fernandez, H. E. Gaub, "Reversible Unfolding of Individual Titin Immunoglobulin Domains by AFM", Science Vol. 276, 1997, p. 1109.

Non-patent Document 6: Yamamoto, Y. Tsuj ii, and T. Fukada, "Atomic Force Microscopic Study of Stretching a Single Polymer Chain in a Polymer Brush", Macromolecules 33, 2000, p. 5995

DISCLOSURE OF INVENTION

Problems to be Solved by the Invention

However, previous researches about interaction at a single molecular level are mainly limited to measurement of specific interaction using biological samples, and a method has not been established of measuring non-bonding interaction between polymer chains at a single molecular level. Further, as a possibility for measuring the inter-polymer interaction, a system can be considered that a polymer chain is grafted onto a solid substrate (see Non-patent Document 6), but even in such a system, it is considered measurement of inter-polymer chain interaction is not easy.

It is an object of the invention to provide a molecule measuring apparatus and molecule measuring method for enabling measurement of intermolecular interaction, and more particularly, a molecule measuring apparatus and molecule measuring method for enabling establishment of an experimental system to measure noncovalent interaction between polymer chains at a molecular level.

Means for Solving the Problem

A molecule measuring apparatus of the invention adopts a configuration provided with a gel substrate material comprised of a gel such that a solvent is contained in a network structure and a molecular chain, a lifting section that lifts the molecular chain, and a measuring section that measures a force applied to the lifting section in lifting the molecular chain.

Advantageous Effect of the Invention

According to the invention, it is possible to provide a molecule measuring apparatus and molecule measuring method for enabling measurement of intermolecular interaction, and more particularly, an experimental system to measure noncovalent interaction between polymer chains at a molecular level. By extending the molecular chain from inside the gel, it is possible to measure stably the interaction between a polymer chain constituting the network structure of the gel and a molecular chain (polymer chain) embedded in the gel. Further, by using the polymer chain to pull out as a probe, it is made possible to measure information on the network structure at a molecular level.

BEST MODE FOR CARRYING OUT THE INVENTION

Embodiment

In this Embodiment, as an example, a case is described that an atomic force microscope is used as an example of a molecule measuring apparatus. A lifting section bonds a molecular chain to a lifting portion, and lifts the molecular chain from the gel substrate material. The following explanation describes using a cantilever as example of the lifting section by using a cantilever.

Figure 1:
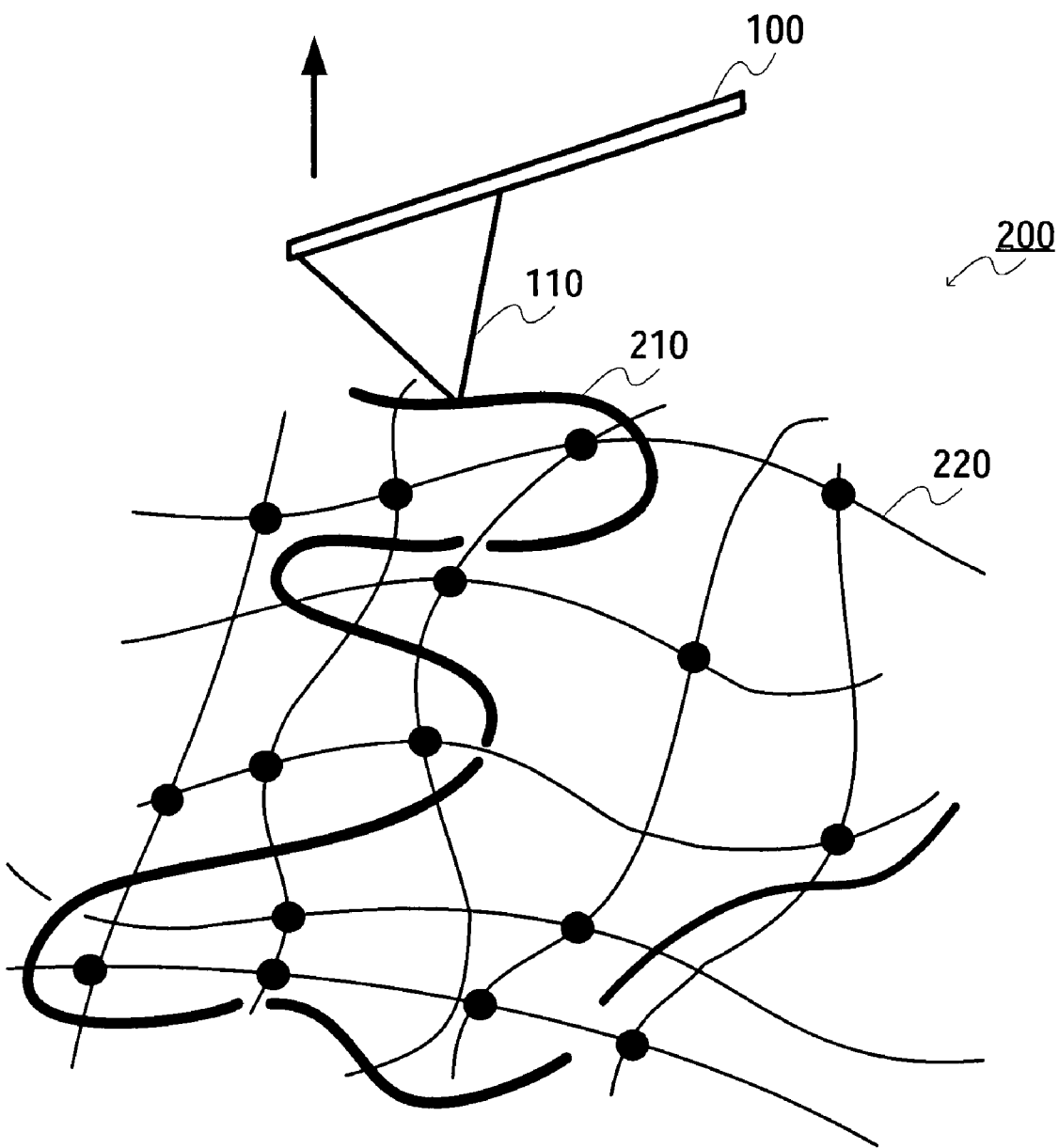
FIG. 1 is a view showing an example of lifting a molecular chain from a gel substrate material using a molecule measuring apparatus according to an embodiment of invention.

FIG. 1 is a view showing an example of lifting a molecular chain from a gel substrate material using the molecule measuring apparatus according to an embodiment of the invention.

Cantilever 100 bonds to molecular chain 210, and lifts molecular chain 210. Probe 110 is a portion that bonds to molecular chain 210.

Gel substrate material 200 is comprised of molecular chain 210 and gel 220 such that a solvent is contained in a network structure. Molecular chain 210 only needs to be a molecular chain that can be embedded in gel 220. Molecular chain 210 and a material to be gel 220 are mixed, making the material to gel, and gel substrate material 200 is prepared. For example, molecular chain 210, a monomer as a material to gel, and a cross-linking agent are mixed, the monomer is made to gel by the cross-linking agent, and gel substrate material 200 can be prepared. Further, it is possible to prepare gel substrate material 200 by a method of mixing two types of polymers (one is molecular chain 210, while the other one is gel 220), and cross-linking only the other one (using radiation or the like). Furthermore, other adjustment methods may be used.

In FIG. 1, to distinguish between molecular chain 210 and gel 220, for the sake of convenience, thicknesses of lines are changed, and portions where gel 220 is cross-linked are shown by black circles. Further, a portion where the line showing molecular chain 210 or gel 220 is cut at opposite ends of another molecular chain 210 or gel 220 represents that molecular chain 210 or gel 220 passes under another molecular chain 210 or gel 220. FIG. 1 is a schematic view to show a structure of gel substrate material 200, and is different from the actual mode. Further, FIGS. 2 and 3, described later, also show schematic views.

Cantilever 100 lifts molecular chain 210 by covalent bond, physical adsorption and the like. For example, probe 110 is chemically modified and bound to molecular chain 210 by covalent bond. Thus, cantilever 100 lifts molecular chain 210 bound to probe 110.

Figure 2:
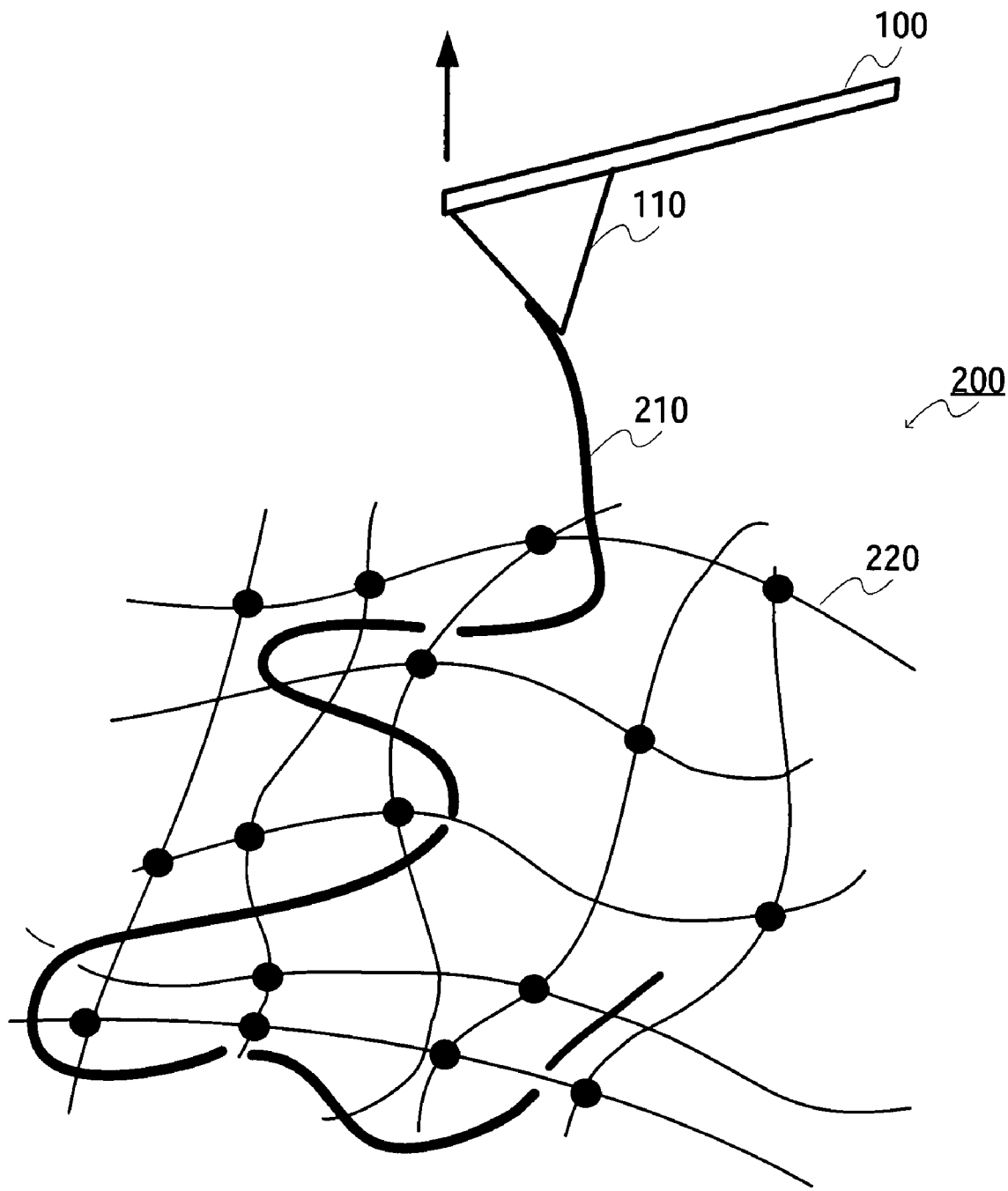
FIG. 2 is a view showing a state where a cantilever lifts the molecular chain.

FIG. 2 is a view showing a state where cantilever 100 lifts molecular chain 210. In FIG. 2, cantilever 100 is spaced a longer distance apart from gel substrate material 200, as compared with the position in FIG. 1. Further, molecular chain 210 is being drawn out of gel 220.

Figure 3:
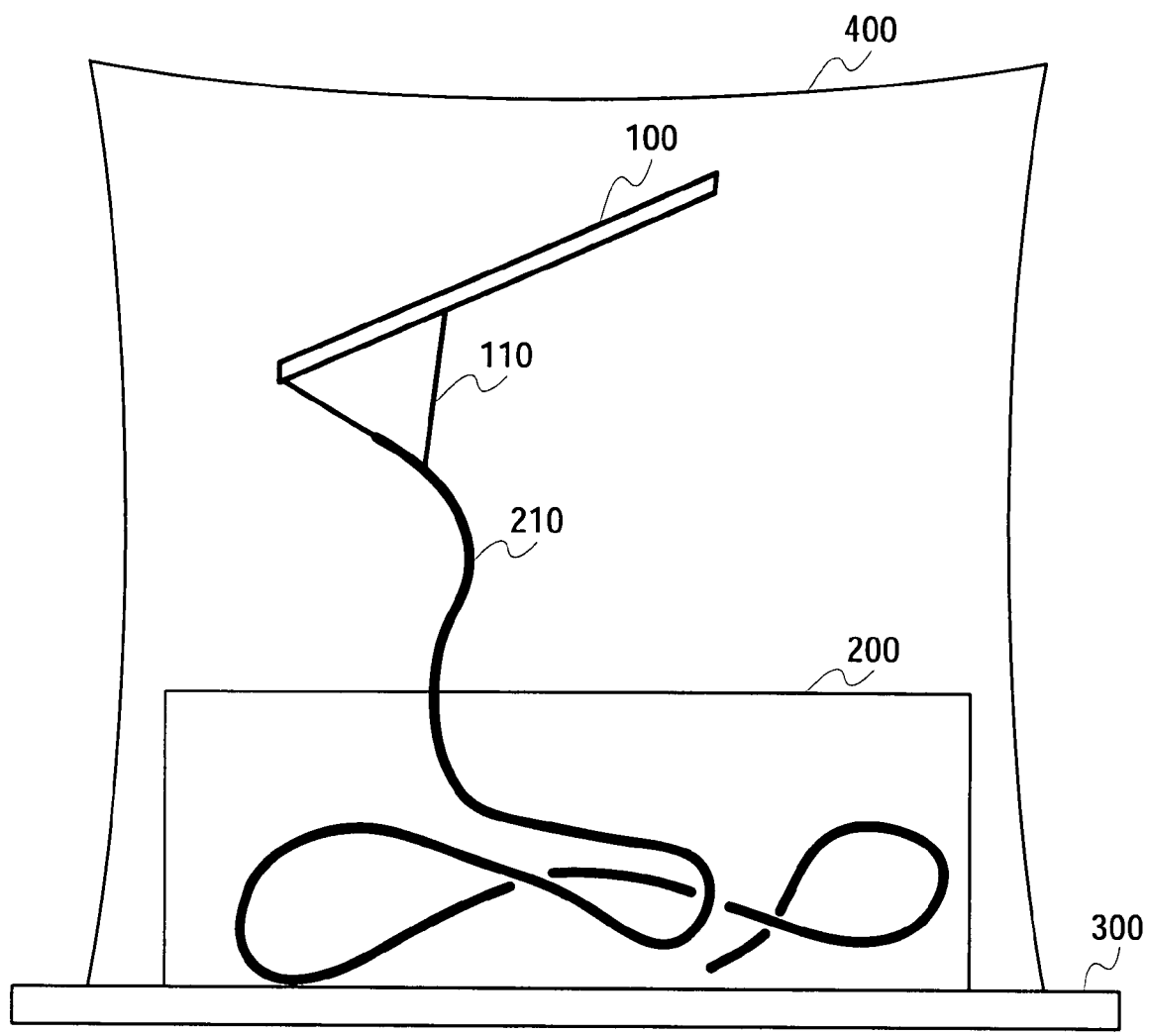
FIG. 3 is a view showing a state of measurement.

FIG. 3 is an example of a view showing a state of measurement, except the AFM apparatus. FIG. 3 omits the polymer network constituting gel 220, and shows an outline of gel substrate material 200 and molecular chain 210. Meanwhile, FIG. 3 shows gel substrate material 220 being inserted in solvent 400 that was not shown in FIGS. 1 and 2. Water or other solvent is used as solvent 400. Solvent 400 is dropped above gel substrate material 200, and envelops gel substrate material 200 and cantilever 100.

Gel substrate material 200 is placed (chemically fixed) onto solid substrate 300. A film thickness of gel substrate material 200 is sufficiently larger than that of molecular chain 210, and large such that probe 110 is not affected by solid substrate 300 when probe 110 comes into contact with gel substrate material 200. Solid substrate 300 is a substrate made of a solid such as glass, metal and the like. As shown in FIG. 3, gel substrate material 200 (particularly, gel 220 contained in gel substrate material 200) also acts as a buffer for solid substrate 300. In other words, probe 110 does not come into contact with solid substrate 300 by the existence of gel substrate material 200, when probe 110 is bound to molecular chain 210. Therefore, it is made possible to prevent damage to probe 110, and thus maintain the chemically modified state of probe 110.

Figure 4:
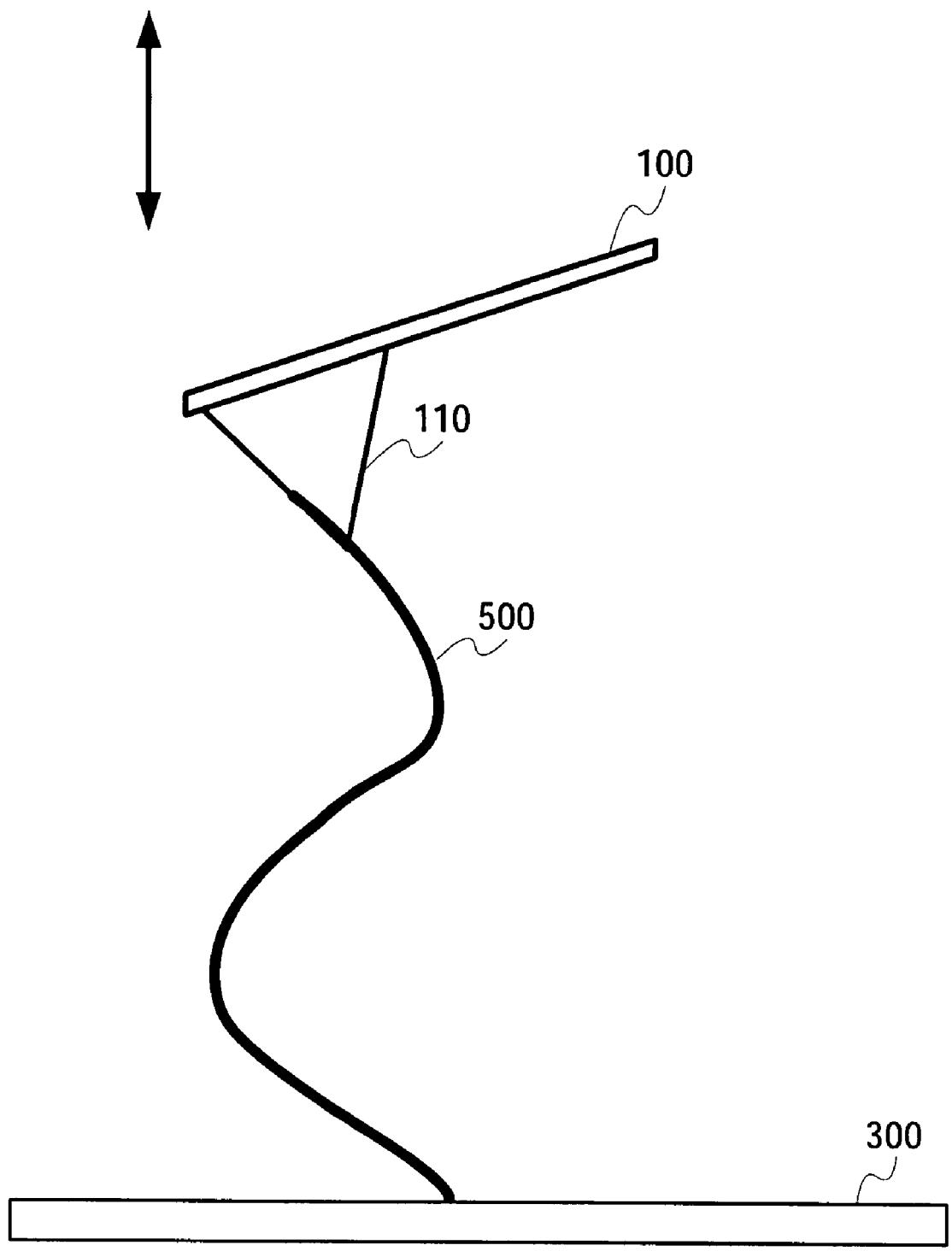
FIG. 4 is a view showing an example of a concept of single-molecule stretch measuring method (force spectroscopy)

FIG. 4 is a view showing an example of a concept of standard single-molecule stretch measuring method (force spectroscopy). FIG. 4 is shown to compare with FIGS. 1 to 3. FIG. 4 shows a single molecular chain 500 which is sandwiched between the surface of solid substrate 300 and probe 110 and then stretched. Solid substrate 300 is the substrate made of a solid such as glass, metal and the like. In FIG. 4, probe 110 of cantilever 100 comes into contact with solid substrate 300, and is bound to molecular chain 500. Since molecular chain 500 is adsorbed to solid substrate 300, the force applied to cantilever 100 includes the tensile force to lift molecular chain 500 and adsorption force when molecular chain 500 peels from solid substrate 300.

According to the molecule measuring method as shown in FIGS. 1 to 3, by measuring the deflection of cantilever 100 (force applied to the lifting section), it is possible to measure inter-polymer chain interaction i.e. interaction between molecular chain 210 and the polymer network constituting gel 220. By stretching the molecular chain embedded in the gel network, the interaction is measured corresponding to relative motion between the molecular chain and the polymer chain of the gel network. Further, since a path through which the molecular chain is pulled out is related to the network structure constituting the gel, it is expected that knowledge is obtained on the network structure from the stretch measurement of molecular chain.

In addition, the gel may be a synthetic gel obtained by gelling polymer monomer or naturally occurring (biogenic) gel (that is not prepared by polymerizing monomer). The naturally occurring gel includes collagen (gelatin), agar and the like.

Further, for molecular chain 210 and gel 220, either case is available that physical properties of one of them are known, or that physical properties of both of them are unknown. For example, by using one substance with known physical properties, it is possible to measure physical properties of the other substance. Further, when a plurality of substances with unknown physical properties is measured using a substance with known physical properties, it is possible to detect properties of the plurality of unknown substances by comparing the known substance with each of the plurality of unknown substances or comparing the plurality of unknown substances with one another. Furthermore, by accumulating results of measurement of various kinds of substances, it is considered that inter-polymer interaction can be predicted. Moreover, for results of measurement using unknown substances, by referring to previously measured results, it is considered that inter-polymer interaction can be predicted.

In addition, this Embodiment is described using cantilever 100 of anatomic force microscope as an example of the lifting section, but the invention is not limited thereto. For example, the invention is applicable to optical tweezers (optical radiation pressure) used in an optical tweezers method, and a glass needle.

Further, it is possible to use protein as molecular chain 210. In this case, one end of protein is fixed to gel 220, and measurement may be performed by lifting the other end bound to probe 110.

EXAMPLE

Examples that were specifically measured will be described below. However, the invention is not limited to the Examples as described below.

Example 1

In Example 1, as an example, used were N-isopropyl acrylamide monomer (NIPA monomer) as a polymer (molecular chain 210 in FIG. 1), acrylamide monomer as a gel (gel 220 in FIG. 1), and N,N'-methylene bisacrylamide as a cross-linking agent.

Described first is a method of preparing the polymer to embed in the gel. Each of the polymer to embed in the gel and the gel was prepared by radical polymerization. For the polymer to embed in the gel, NIPA monomer (700 mM) and ammonium sulfate (400 mg/L) were dissolved in pure water, N,N,N',N'-tetramethylethylene diamine (2.4 mL/L) was added, and radial polymerization was started at room temperature. The reaction was carried out for 24 hours, dialysis was performed, and finally, freeze-drying was performed.

Described next is a method of preparing the gel substrate material. The gel and freeze-dried polymer were dissolved in pure water. Acrylamide monomer was 700 mM, and an amount of the freeze-dried polymer was 10 to 50 mM. After dissolving N,N'-methylenebisacrylamide (8.6 mM) and ammonium sulfate (400 mg/L), N,N,N',N'-tetramethylethylene diamine (2.4 mL/L) was added. The solution was immediately inserted into two glass substrates (only one of the substrates was treated with Bind-Silane™) with a clearance of about 50 μm and made to gel. The reaction was carried out for 24 hours, and the glass substrate that was not treated with Bind-Silane was removed from the gel. The prepared gel substrate material was cleaned by a large amount of pure water for several days.

Figure 5:
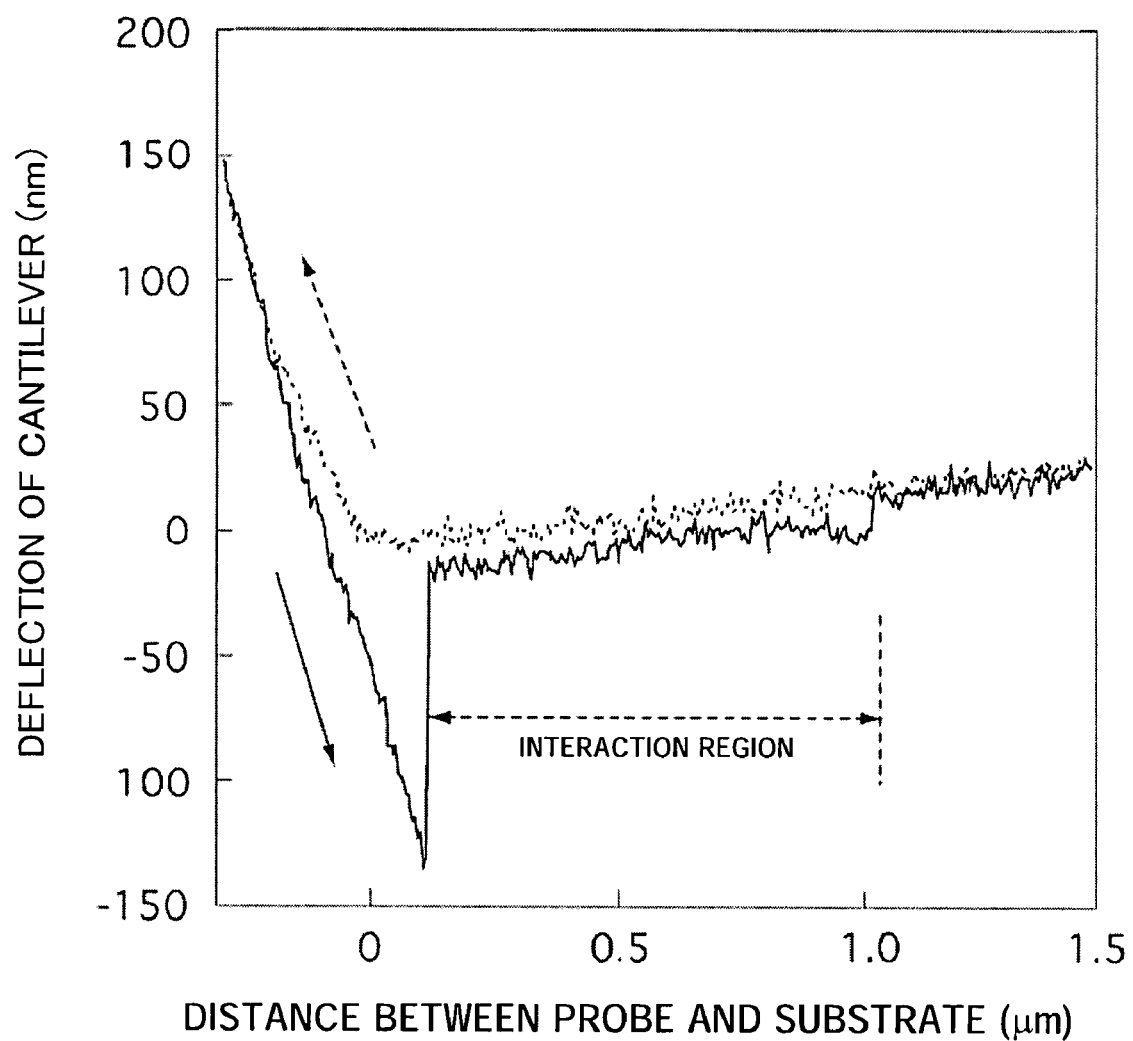
FIG. 5 is a graph showing an example of a force curve measured by using a sample wherein N-isopropyl acrylamide monomer is embedded in a gel as an Example of the invention.

Described next is measurement by atomic force microscope (AFM measurement). The sufficiently cleaned gel substrate material was mounted on an AFM stage, and the force curve was measured in pure water. FIG. 5 shows the measurement result.

FIG. 5 is a graph showing an example of the force curve measured using a sample that the N-isopropyl acrylamide was embedded in the gel. The horizontal axis represents the distance between probe 110 and substrate (gel substrate material 200), while the vertical axis represents a relative value of a displacement amount of cantilever 100. The displacement amount of the cantilever shown by the dotted lines is an example of the force curve when cantilever 100 approaches gel substrate material 200, while the displacement amount of the cantilever shown by the solid line is an example of the force curve when cantilever 100 is taken away from gel substrate material 200. In the dotted lines in the figure, from right to left, the operation is performed of bringing probe 110 nearer to gel substrate material 200. In the solid line in the figure, from left to right, the operation is performed of taking probe 110 further away from gel substrate material 200. The arrows of the dotted line and solid line indicate the direction of lapse of time.

The large downward peak of the solid line shows a point at which probe 110 was shifted to a state where probe 110 was spaced apart from gel substrate material 200 from another state where probe 110 and gel substrate material 200 were absorbed to each other after probe 110 was pushed into gel substrate material 200. It is clear that extension occurred at a constant force by about 1 μm after the absorption (interaction region in the figure). It can be judged by a difference generated in the value of displacement amount between the solid line and dotted lines to be parallel. Since the tensile force is not dependent on the distance, the force is not the tensile force caused by the polymer being stretched, but the force can be considered being caused by interaction (non-bonding intermolecular interaction) due to relative motion (including friction) when the polymer was pulled out of the gel. By thus using gel substrate material 200, it is possible to measure mechanical interaction between polymers.

Comparative Example 1

Figure 6:
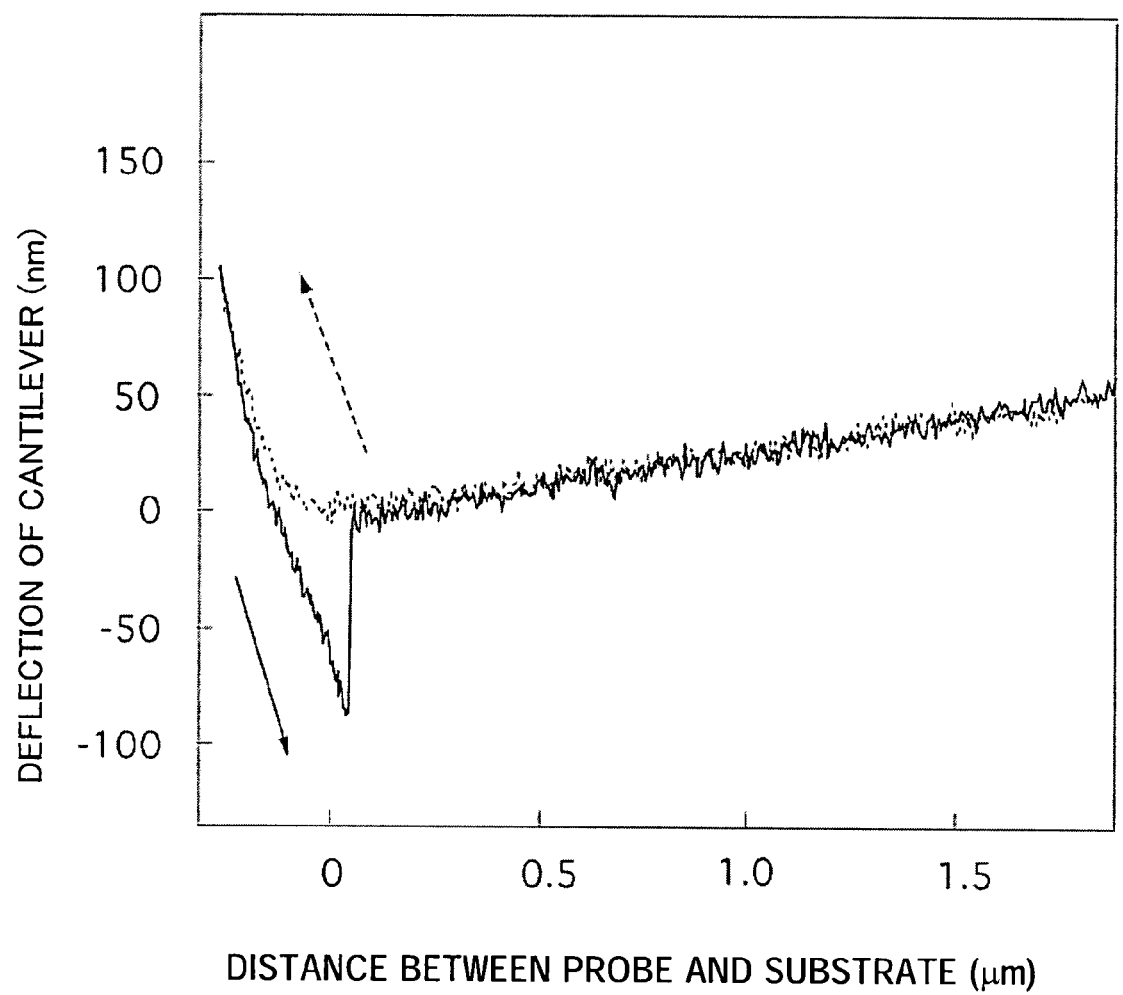
FIG. 6 is a graph showing an example of a force curve measured by using a sample wherein the monomer is not embedded in the gel as a Comparative Example.

In Comparative Example 1, without embedding the polymer in the gel unlike Example 1, the gel substrate material was prepared (or adjusted) using only the gel. The adjustment method of the gel substrate material and AFM measurement were the same as in Example 1. FIG. 6 shows the measurement result. In addition, for the adjustment method of the gel substrate material, Example 1 and Comparative Example 1 were different from each other only in a respect of whether or not the polymer comprised of the NIPA monomer was contained in acrylamide i.e. gelation was performed with a small amount of the NIPA polymer added to the acrylamide solution (solution prior to the gel) or gelation was performed with no NIPA polymer. Herein, it is possible to ignore the effect on the structure of formed acrylamide gel due to addition of a small amount of the NIPA polymer.

FIG. 6 is a graph showing an example of the force curve measured by using a sample where the monomer is not embedded in the gel. The horizontal axis and vertical axis are the same as in FIG. 5, and the dotted lines and solid line show the same operation as in FIG. 5. As compared with FIG. 5, the mutual interaction region is not detected in FIG. 6. Further, not shown in the figure, it has been known from experiments that the same force curve as in FIG. 6 is drawn when probe 110 is not bound to polymer and does not lift the polymer even in the case of using gel substrate material 200 with the polymer embedded in the gel.

From FIGS. 5 and 6, in the case of only the gel (Comparative Example 1), only the adsorption force appears (the level of the force differs every time) as shown in FIG. 6, and the long-distance interaction does not appear. Even in a system that gel contains a slight amount of single polymer, the result as shown in FIG. 6 is obtained in many cases. The result indicating the long-range interaction as shown in FIG. 5 is rarely obtained. In the interaction region of the force curve as shown in FIG. 5, the applied force exhibits a constant value. This indicates that the interaction force originates from pulling a single polymer chain out of the gel(polymer/polymer interaction), rather than the tensile force of stretching a single molecule. Further, an extension curve is rarely obtained such that the tensile force increases in a non-linear manner with respect to the extension distance. It is considered that such a curve corresponds to the tensile strength caused by extension of the polymer after the polymer was embedded in the gel.

By the way, this Example is merely an example, it is possible to adjust gel substrate material 200 that is a mixture of another molecular chain and gel which is not described above, and the shape of the force curve as shown in FIG. 5 also varies with gel substrate material 200. Further, it is not to mention that the force curve differs due to the case that molecular chain 210 breaks in some part of the chain, the interaction between molecular chain 210 and gel 220 and the like. Furthermore, in the cases that a combination of molecular chain 210 and gel 220 is the same, it is expected that the force curve differs due to the concentration of the chain 210 and gel 220, or measurement environments (for example, temperature, pressure, and the like). Moreover, it is expected that different force curves are drawn by measurement of varying the pulling speed (speed dependence).

The present application is based on Japanese Patent Application No. 2004-262227 filed on Sep. 9, 2004, entire content of which is expressly incorporated by reference herein.

INDUSTRIAL APPLICABILITY

The molecule measuring apparatus and molecule measuring method according to the invention enable to study interaction between molecular chains, are suitable for use in an experimental system for measuring interaction between polymers. In particular, using a molecule to pull out as a probe, it is possible to examine physical properties of the gel-shaped substrate side. Further, it is expected the invention is useful as an experimental system for measuring molecules of which properties tend to change on a solid surface. Furthermore, as compared with a solid substrate, it is possible to prevent destruction of the probe, and maintain the chemically modified state.

The invention claimed is:

1. A molecule measuring apparatus using a gel substrate material, comprising:
   the gel substrate material formed of a gel where a solvent is contained in a gel network structure comprised of a polymer chain, and a molecular chain;
   a lifting section that lifts the molecular chain; and
   a measuring section that measures a force applied to the lifting section in lifting the molecular chain,
   wherein the lifting section lifts the molecular chain from the gel substrate material by covalent bond or physical bond with the molecular chain, and the apparatus thereby measures interaction between the molecular chain and the polymer chain constituting the gel network structure.

2. The molecule measuring apparatus according to claim 1, wherein the lifting section is a cantilever, optical tweezers, or a glass needle.

3. A molecule measuring method using a gel substrate material, comprising:
   preparing the gel substrate material formed of a gel where a solvent is contained in a gel network structure comprised of a polymer chain, and a molecular chain;
   lifting the molecular chain by a lifting section; and
   measuring a force applied to the lifting section in lifting the molecular chain,
   wherein the lifting section lifts the molecular chain from the gel substrate material by covalent bond or physical bond with the molecular chain, and interaction between the molecular chain and the polymer chain constituting the gel network structure is thereby measured.

* * * * *